United States Patent [19]

Hinrichs et al.

[11] Patent Number: 4,559,810

[45] Date of Patent: Dec. 24, 1985

[54] METHOD FOR DETERMINING RESIN VISCOSITY WITH ULTRASONIC WAVES

[75] Inventors: Richard J. Hinrichs, Cerritos; Judy Thuen, Capistrano Beach, both of Calif.

[73] Assignee: Applied Polymer Technology, Inc., Carlsbad, Calif.

[21] Appl. No.: 621,052

[22] Filed: Jun. 15, 1984

Related U.S. Application Data

[62] Division of Ser. No. 281,877, Jul. 9, 1981, Pat. No. 4,455,268.

[51] Int. Cl.[4] .................. G01N 11/00; G01N 29/02
[52] U.S. Cl. ........................................ 73/54
[58] Field of Search ....................... 73/54, 599, 590

[56] References Cited

U.S. PATENT DOCUMENTS

| | | | |
|---|---|---|---|
| 2,755,662 | 7/1956 | Swengel | 73/54 X |
| 2,966,058 | 12/1960 | McSkimin | 73/54 X |
| 3,553,636 | 1/1971 | Baird | 73/54 X |
| 3,659,974 | 5/1972 | Neugroschl | 425/29 |
| 3,696,661 | 10/1972 | Garabrant et al. | 73/54 |
| 4,044,600 | 8/1977 | Claxton et al. | |
| 4,312,228 | 1/1982 | Wohltjen | 73/597 |
| 4,327,587 | 5/1982 | Docekal et al. | 73/590 |
| 4,346,599 | 8/1982 | McLaughlin et al. | 73/597 |

FOREIGN PATENT DOCUMENTS 444092 10/1974 U.S.S.R. .................. 73/54

*Primary Examiner*—Stewart J. Levy
*Assistant Examiner*—Joseph W. Roskos
*Attorney, Agent, or Firm*—Klein & Szekeres

[57] ABSTRACT

A method for determining the dynamic viscosity of a specimen of a polymeric resin which is subjected to a time-varying temperature includes the steps of passing an ultrasonic sensing wave of known amplitude through the specimen, sensing the amplitude of the wave after it has travelled through the specimen, and from the degree of amplitude attenuation, obtaining a value which has a linear relationship to the logarithm of the instantaneous dynamic viscosity of the resin.

8 Claims, 5 Drawing Figures

METHOD FOR DETERMINING RESIN VISCOSITY WITH ULTRASONIC WAVES

This application is a division of application Ser. No. 281,877, filed July 9, 1981, now U.S. Pat. No. 4,455,268.

BACKGROUND OF THE INVENTION

1. Field of the Invention

This invention relates generally to the field of process control technology, and, more particularly, it relates to an automated system for controlling the cure cycle for structures or parts made of fiber reinforced composite material and the like, in which the physical characteristics such as temperature and viscosity of the part itself, are used as active process control parameters.

2. Brief Description of the Prior Art

As their name implies, fiber-reinforced composite materials (also known simply as "composites") comprise a base or substrate material, such as an epoxy resin, which is impregnated, for structural strength, with fibers of such materials as carbon, graphite, glass, boron, and nylon. Composites typically exhibit extremely high strength-to-weight ratios, and, accordingly, their use is becoming increasingly popular in the aerospace industry.

One problem still associated with composites is the relatively high cost of fabricating structural parts, such as, for example, aircraft fuselage, wing, and tail sections, from composite materials. A significant factor in the cost of fabricating such parts lies in the care required to control the shape and thickness of the part throughout the fabrication process, while also achieving the necessary degree of structural integrity and strength of the part. Accordingly, new means are constantly being sought for achieving these ends more efficiently and at lower cost.

In fabricating a structure, such as an aircraft part, from composite materials, usually the part is first shaped by laying a preselected number of layers of raw or partially cured composite material on a mold. When the desired shape is achieved, the composite is subjected to a final curing process by placing the part in a pressurized oven known as an autoclave. In the autoclave, polymerization of the resin substrate is completed so that the molded shape is made permanent and the composite material is made hard and durable. Strictly speaking, the final curing process usually completes the final cross-linking of the prepolymerized resin substrate.

Controlling the curing process presents some difficult problems. For example, the viscosity of the resin substrate changes during the curing process and, at times, the viscosity is low enough so that the resin is quite capable of flowing. Controlled flow of the resin is desired at certain times during curing to achieve the required part shape thickness and a structural strength. However, if the resin is allowed to flow in an uncontrolled manner, undesired micro-void formations and/or variations in the thickness of the part can occur. These anomalies can be minimized or controlled by appropriate applications of pressure and temperature during the cure cycle.

For any given part geometry, the flow of the resin is determined by its viscosity and ambient pressure. The viscosity of the resin, in turn, is a function of temperature and of the time the resin has already been subjected to the final curing process. Thus, as temperature and pressure are varied during the curing cycle, the resin will undergo changes in viscosity. For each particular resin, and given temperature variation during the curing cycle, it is possible to empirically determine a "viscosity behavior profile" or "VBP." Given the empirically-derived VBP for a particular resin, it is possible to theoretically predict the viscosity of that resin at any time during the curing cycle. In accordance with the foregoing, present day curing process control techniques monitor temperature and pressure during the cure cycle and manually adjust these parameters in the expectation of achieving a viscosity at any point in time which closely matches the viscosity predicted on the basis of the VBP.

The above noted prior art method of controlling the curing process has shortcomings, however. More particularly, it has been found that the actual viscosity of the resin during the curing cycle often does not parallel closely the expected viscosity behavior profile. This aberration is due to a variety of factors, the most notable ones being variations in the moisture content of the resin and in the production techniques used to make the pre-impregnated resin ("pre-preg"). Furthermore, the final polymerization and cross-linking reactions of the resin which ideally occur only during the final curing step, also occur, albeit at a slow and varying rate, in the pre-impregnated resin. Therefore, even resins having the same original chemical composition may have different states of polymerization when the final curing process is initiated, and therefore will display somewhat different viscosity behavior profiles under the same cure process conditions. Accordingly, a prediction of expected viscosity during a particular point in the cure process based solely upon measurement of temperature and pressure yields results that are, at best, poor approximations of the actual viscosity values.

Part thickness and resin/fiber ratio are functions of the flowing ability of the resin. Furthermore, the flowing ability of the resin is related to its viscosity. Therefore, it can be appreciated that an improved ability to monitor or predict the viscosity of the resin during the curing process is likely to lead to improved ability to finely control part thickness and resin fiber ratios, and therefore the structural strength of the composite parts.

Another factor having an effect on the structural characteristics of the finished composite part is the porosity of the cured composite material. This porosity is a result of the presence of microscopic voids ("microvoids") produced by the release of volatile materials (usually water vapor) during the cure process. It is usually desired to minimize the porosity of the finished part, and this can be achieved through judicious application of pressure during the curing cycle. However, the effectiveness of such application of pressure for the purpose of minimizing the porosity of the composite material is dependent upon the actual viscosity behavior profile during the cure cycle. Moreover, since it is difficult to ascertain accurately the moisture content of the pre-impregnated resin prior to the initiation of the cure cycle, and since the formation of microscopic voids in the materials during the cure cycle cannot be measured or monitored in any meaningful way, the pressure control of porosity during the curing cycle is likely to be non-optimal without means for substantially continuously monitoring the actual viscosity of the resin during the curing cycle.

In view of the foregoing, a two-fold need has been felt in the industry for improved monitoring and control of the curing process. First, it has been a desired goal in the industry to monitor actual temperature, pressure and most importantly, viscosity at various points on the part at various times during the curing cycle, and to control the applied temperature and pressure in accordance with a comparison between a desired temperature, pressure and viscosity profile and the actual, or sensed, profiles. Second, there has been a need for reliably minimizing the development of microvoids in the part as the part is cured.

With regard to the viscosity monitoring function, one method that has been explored in the prior art, measures the viscosity of the substrate through changes in the substrate's dielectric properties. See, for example, Mayberry, "Dielectric Cure Monitoring of Polyimides,1" publishd in *In-Process Quality Control for Non-Metallic Materials* by U.S. Army Materials and Mechanics Research Center, Watertown, Mass. (1980). While this method has shown some promise, it has yet to see significant commercial application, due, in large part, to a lack of reliability, and unacceptably low signal-to-noise ratios.

With regard to the problem of minimizing the development of microvoids, little has been accomplished to date in the way of "in-process" methods. Rather, emphasis has been placed on non-destructive evaluation of the cured part to ascertain its porosity, and then adjusting the processing parameters based upon this "after-the-fact" evaluation. The most promising non-destructive evaluation technique involves the use of either acoustic emission analysis or acoustic stress wave factor analysis. Both of these techniques make use of the fact that an analysis of the acoustic properties of the material can yield important data relating to its structural characteristics. In the acoustic emission technique, the sample is stressed or loaded in a predetermined way, and the resultant low amplitude, ultrasonic noise is analyzed. See for example Green and Landy, "Acoustic Emission NDE for Advanced Composite Structures," Acoustic Emission Technology Corporation, 1979.

In the acoustic stress wave factor technique, an ultrasonic pulse is transmitted through the material for a given distance and then received. The received pulse is then analyzed, and the results of this analysis yield data related to the structural characteristics of the material. See, for example, Vary and Lark, "Co-relation of Fiber Composite Tensile Strength with the Ultrasonic Stress Wave Factor," *Journal of Testing and Evaluation,* Volume 7, No. 4, (1979). While in-process use of the acoustic emission technique has been attempted, the need for stressing or loading the material while it is in the autoclave has made the practical application of this method difficult.

Accordingly, the need has been felt in the industry for a method for accurately and non-destructively monitoring the viscosity of the substrate during the curing cycle, and for using the results of the viscosity measurements for interactively controlling autoclave temperature and pressure. A further need has been felt for a practical, in-process mechanism for controlling or minimizing the formation of micorvoids so as to produce composite parts of low porosity.

SUMMARY OF THE INVENTION

Broadly, the present invention comprises an automated system for controlling the curing process of composite structures through an interactive, computerized feedback system. The system which interfaces directly with existing autoclave equipment, includes sensors for accumulating real time information regarding ambient and part surface temperature, ambient pressure, and the visco-elastic state of the composite material during the curing process. The measured values of these parameters are compared to pre-determined optimal values, and corrections are then made to the operational parameters to achieve an optimal curing process and thereby desired specifications of cured composite structure.

Specifically, the control system of the present invention comprises a temperature-regulating mechanism and dual, interactive pressure regulating mechanisms. With regard to the temperature-regulating mechanism, the temperature at various locations on the surface of the structure being fabricated (i.e., the "part temperature") is substantially continuously compared to a specified part temperature-time profile. Next, the ambient autoclave temperature is measured and compared with a specified maximum allowable autoclave temperature for that specified part temperature. Finally, the maximum temperature gradient across the part is compared to a specified maximum temperature gradient. If any of these comparisons indicates that excessive heat is being applied to the part, controls are actuated to lower the autoclave temperature. On the other hand, if the results of these comparisons indicate that insufficient heat is being supplied to the part, then controls are actuated to increase the autoclave temperature.

With respect to the first of the dual pressure-regulating mechanisms, the ambient pressure inside the autoclave is measured and compared to a reference pressure which is specified by a predetermined optimal pressure-versus-time profile. If the ambient pressure is greater than the reference pressure, a vent valve control mechanism is actuated to release pressurizing gas from inside the autoclave until the reference pressure is reached. Likewise, if the ambient pressure is below the reference pressure, a valving mechanism is actuated to allow pressurized gas to enter the autoclave to raise the pressure to the desired reference value.

The second pressure control mechanism operates by monitoring the visco-elastic properties of the composite material as it is cured and then comparing the measured values with a pre-selected viscosity behavior profile or to a preselected constant reference viscosity value. This is accomplished by introducing an ultrasonic wave into the part being cured and computing the resultant acoustic or ultrasonic wave factor by measuring the amplitude attenuation or velocity of the ultrasonic waves. From the measured wave factor at any point during the cure cycle, the viscosity of the material is derived and compared to a reference value taken at that particular temporal point in a pre-selected optimal viscosity behavior profile or the preselected constant reference viscosity value. If the measured viscosity is at the appropriate reference value and if the first pressure control mechanism so dictates, a valving mechanism can be actuated to increase the ambient pressure in the autoclave to achieve a pressurization which is consistent with a desired resin flowability at the temperature corresponding to the reference viscosity value. Likewise, if the measured viscosity is lower than the reference value, the pressurization of the autoclave can be delayed to allow the viscosity to achieve the desired value before pressurization begins.

The system utilizes temperature-sensitive means such as thermocouples placed at various locations on the surface of the part being cured and at various locations within the autoclave to measure part temperature and autoclave ambient temperature, respectively. Pressure measurements are taken by means of pressure transducers located inside the autoclave. The acoustic or ultrasonic wave factor is obtained, as previously mentioned, by means of an ultrasonic wave generating apparatus utilizing transmitting and receiving acoustic transducers located at various locations on the surface of the part, the received acoustic signal being converted by appropriate signal treatment means into an electrical signal indicative of the wave factor.

The analog electrical signals indicative of part temperature, autoclave pressure, and wave factor are fed into a data acquisition and control unit which converts the analog signals to digital signals for input into a data processing unit. The data processing unit includes a memory which has stored within it the desired part and ambient temperature-versus-time profiles, and the required pressure-versus-time profile, as well as the desired viscosity behavior profile (VBP) or the preselected constant reference viscosity value. The VBP which is a reference parameter of resin viscosity as a function of time and temperature, or the constant reference viscosity value as applicable, are selected on the basis of the chemical composition and visco-elastic characteristics of the composite resin prior to the final curing process, and also on the basis of the desired physical characteristics of the finished part. The data processing unit is also provided with a clock or timing apparatus so that the values of the operational parameters can be measured in a real time mode. The memory also contains the operational software with which the data processing unit is programmed. The stored software includes a process control algorithm which directs the system through the procedural sequence summarized above, making the necessary comparisons and computations as required in each step of the sequence. Digital output signals are generated by the data processing unit which are fed back into the data acquisition and control unit, where they are converted to analog signals to which the autoclave temperature and pressure controlling mechanisms respond. A data display unit is connected to the data processing unit and may include a CRT terminal for real time readout of the operational parameters as well as a printer and/or plotter for hard copy output.

As will be appreciated from the foregoing, and from the detailed description that follows, the present invention provides several significant advantages over prior art process control systems. For example, the present invention allows control of the autoclave input parameters (i.e., pressure and temperature) based upon a reliable and accurate monitoring, rather than mere predictions, of the desired output parameter (i.e., viscosity). Moreover, by use of real time monitoring of the viscoelastic properties of the composite material, and the real time control of autoclave pressure based upon the results of such monitoring, optimal pressure conditions can be reliably obtained for minimizing the formation of microvoids during the curing process. The dual pressure controlling mechanism of the invention allows the control of pressure on the basis of both an empirically derived pressure profile and a specified viscosity behavior profile, thereby increasing the accuracy and reliability of the pressure control mechanism. In addition, the ability to measure both part temperature and autoclave ambient temperature provides added flexibility for interactive operator control on the basis of maximum temperature overshoot, as well as part surface temperature differentials.

These and other advantages of the invention will be apparent from the detailed description and appended drawing Figures which follow.

DESCRIPTION OF THE PREFERRED EMBODIMENT

The following specification taken in conjunction with the drawings sets forth the preferred embodiment of the present invention in such a manner that any person skilled in the arts relating to the curing of composite materials and in the electronic arts can use the invention. The embodiment of the invention disclosed herein is the best mode contemplated by the inventors for carrying out their invention in a commercial environment, although it should be understood that various modifications can be accomplished within the parameters of the present invention.

Figure 1:
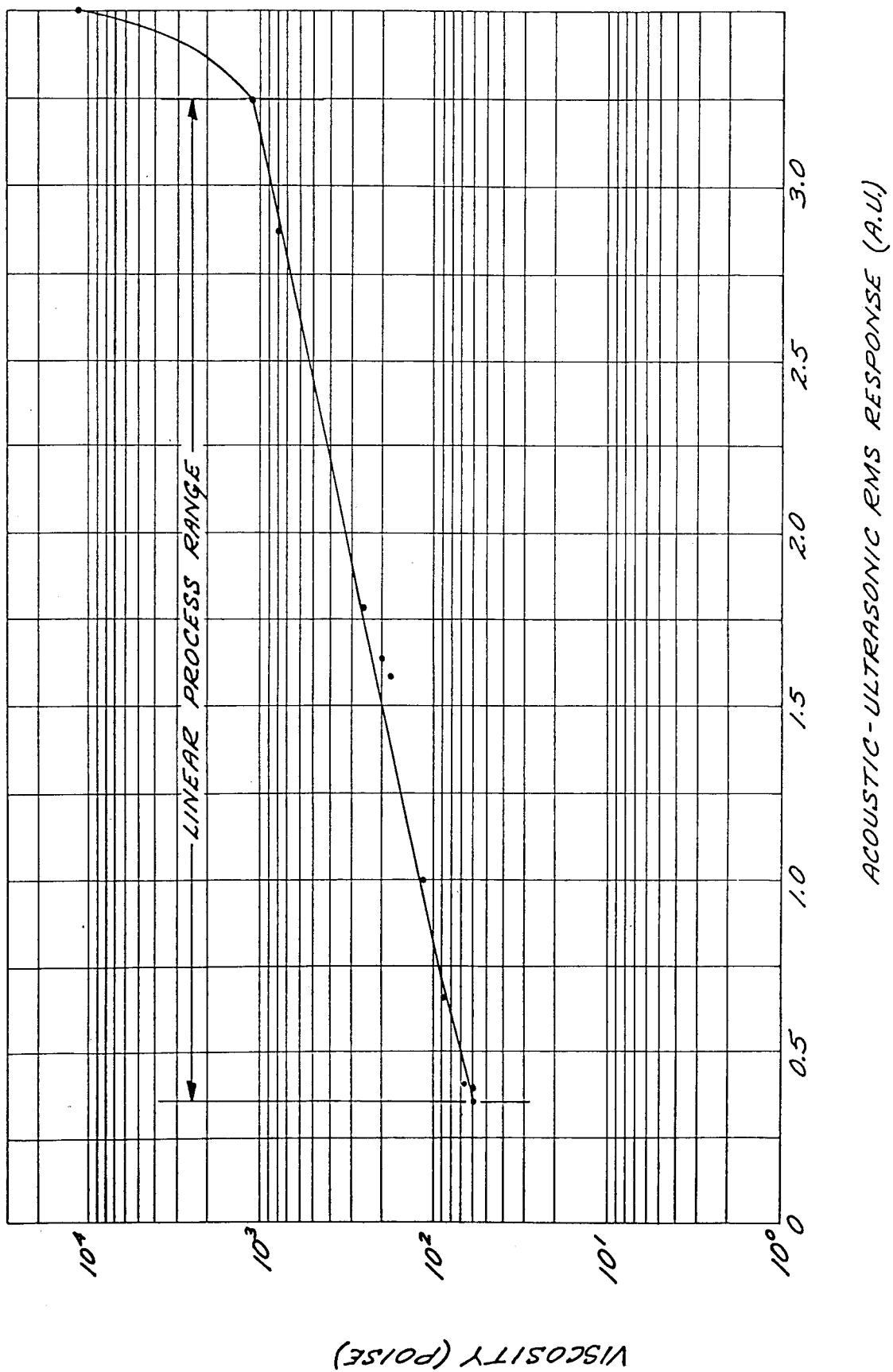
FIG. 1 is a graph showing a linear relationship between the attenuation of an ultrasonic wave in a composite structure and the logarithm of the viscosity of the composite.

Referring now principally to FIG. 1, it has been discovered in accordance with the present invention that the ultrasonic wave attenuation (a.u.) of a composite structure which undergoes a final curing step, has a direct mathematical relation to the dynamic viscosity ($\eta^*$) of the composite structure. As it was discussed above in the introductory section of the present application for patent, the dynamic viscosity is a very important parameter of the curing process. Non-destructive and substantially continuous monitoring of the dynamic viscosity of the composite structure during the curing process has been a desired, but hitherto elusive goal of the composite manufacturing arts. For the sake of brevity, in the ensuing description, the term composite is used, unless otherwise indicated, to denote a composite structure of a specific shape and composition which is undergoing a final curing step in an autoclave or like device under application of heat, and possibly pressure as well.

More particularly, it has been discovered in accordance with the present invention that the attenuation of an ultrasonic wave (a.u.) which is induced in the composite by state of the art instruments while the composite is undergoing the final curing process, bears a linear relationship to the natural logarithm (ln) of the dynamic viscosity ($\eta^*$) of the composite. This linear relationship exists in a range of viscosity and ultrasonic wave attenuation which is substantially in the entire working range of the curing process of the composite.

The linear relationship is amply shown on the graph of FIG. 1, wherein the logarithm of the dynamic viscosity ($\eta^*$) of the composite, expressed in poise units, is plotted against the amplitude of the ultrasonic wave which is measured by suitable receiver sensors while the incoming ultrasonic wave amplitude is kept constant. Those skilled in the arts of physics, will readily appreciate that under the above-noted conditions, the measured root mean square amplitude values are linearly proportional to the amplitude attenuation (a.u.).

The points indicated on the graph of FIG. 1 represent actual measurements of ultrasonic wave amplitude, and of viscosity which was measured by standard rheological control methods. The straight line of the graph was drawn by application of the mathematical least square method so as to best approximate the measured values. The linear relationship shown on FIG. 1 is expressed by Equation 1

$$Ln\eta^* = M(a.u.) + C \qquad [\text{Equation I}]$$

wherein $\eta^*$ and a.u. have the hitherto defined meanings, and M and C are constants. More specifically, M is termed a gain coefficient which is constant for a specific fiber and resin containing material, and geometry or shape of composite structure. C is termed a geometric offset factor which is constant for a specific orientation of the sensors utilized for the determination of the a.u. on a specific composite structure.

It follows from the foregoing, that once the values of M and C are empirically determined for a specific composite having a specific orientation of associated ultrasonic sensors, thereafter the dynamic viscosity of the composite may be measured by simply measuring the a.u. of the particular composite-sensor combination. The above described principle thus allows direct, non-destructive measuring or continuous monitoring of the dynamic viscosity of a composite as the composite undergoes a final curing process.

The enclosed table (Table I) shows the results of a computer performed multiple regression analysis on the measured values of a.u. and the rheologically measured values of viscosity. Table I shows that the above-noted linear relationship between a.u. and $\ln \eta^*$ is very good, and that in the example specifically disclosed in Table I and shown in FIG. 1, the constant M has a value of 0.99354 and C has a value of 3.7138.

TABLE I

| natural logarithm of dynamic viscosity measured by standard rheological method ($\ln \eta^*$) | a.u. | natural logarithm of dynamic viscosity calculated by Equation I wherein M and C have the below defined numerical values |
|---|---|---|
| 4.02535 | 0.35 | 4.0656 |
| 4.12713 | 0.39 | 4.1058 |
| 4.18965 | 0.40 | 4.11586 |
| 4.44265 | 0.62 | 4.33699 |
| 4.68213 | 0.99 | 4.70889 |
| 5.0814 | 1.57 | 5.29187 |
| 5.23644 | 1.62 | 5.34213 |
| 5.51343 | 1.77 | 5.4929 |
| 5.65249 | 1.86 | 5.58336 |
| 6.65929 | 2.86 | 6.58851 |
| 7.00307 | 3.26 | 6.99056 |
| 7.0000 | 3.26 | 6.99056 |

M = 0.99354
C = 3.7138

Figure 2:
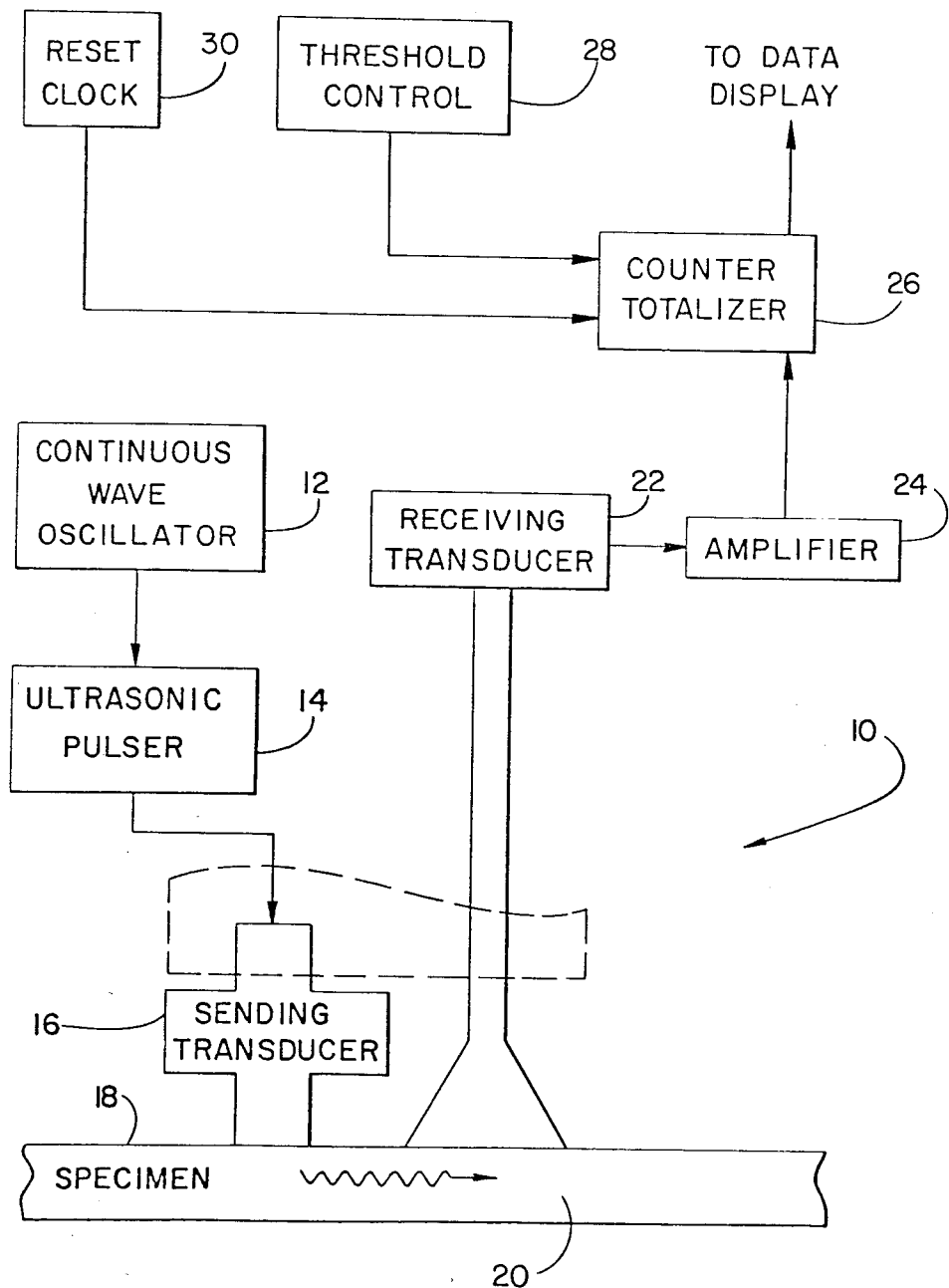
FIG. 2 is a schematic view of an ultrasonic wave attenuation measuring device.

Referring now to the schematic view of FIG. 2, a state of the art ultrasonic wave attenuation measuring device 10 is shown. The device 10 is commercially available as model no. 206AU of the Acoustic Emission Technology Corporation of Sacramento, Calif. It should be noted for the sake of clear understanding of the present invention that while the ultrasonic wave attenuation measuring device 10 is known in the art, and therefore need not be described here in detail, the use of the measured ultrasonic wave attenuation for determining dynamic viscosity is new, and constitutes an important aspect of the present invention.

Thus, the ultrasonic wave attenuation measuring device 10 includes a continuous wave oscillator 12 coupled to an ultrasonic pulser 14 which is coupled to a sending transducer 16. The sending transducer 16 is coupled to the surface 18 of the composite or specimen 20. A receiving sensor or transducer 22 is also coupled to the surface 18 of the specimen 20. Signals emanating from the receiving transducer 22 are amplified in an amplifier 24, are counted in a counter totalizer 26, and may be displayed in a suitable data display or fed into a computer. The ultrasonic wave attenuation measuring device 10 also includes a threshhold control 28 and a suitable reset clock 30. The device 10 is capable of operating in the frequency range between approximately 30 KHz and 2.5 MHz and in the 20–190 decibel range. The above disclosed process for measuring the viscosity by measuring ultrasonic wave attenuation in the composite is preferably practiced, however, with ultrasonic waves in the 100 KHz to 2.5 MHz range.

Figure 3:
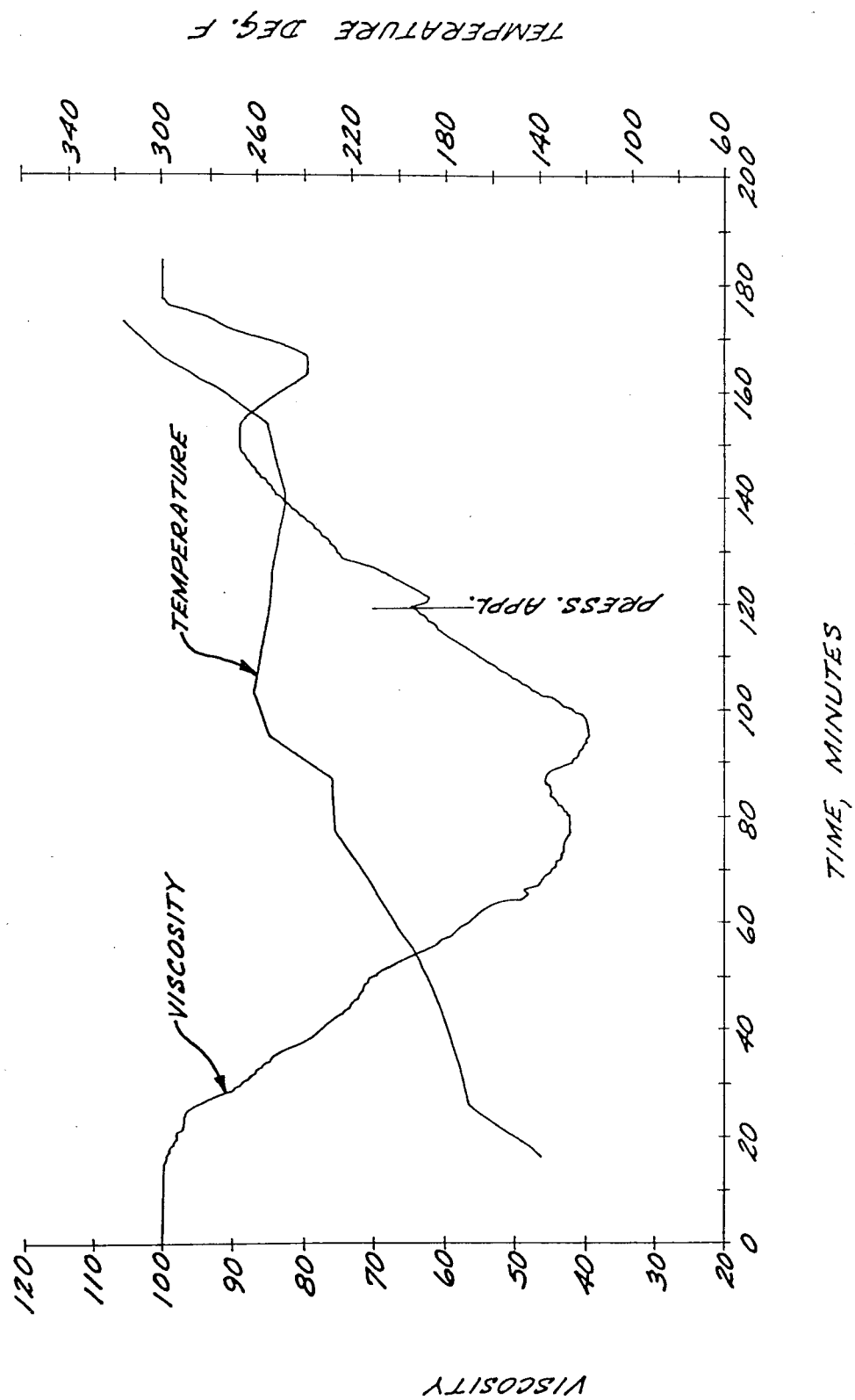
FIG. 3 is a graph showing an actual viscosity-versus-time and temperature-versus-time profile of the final curing step of a composite structure.

Referring now to the graph of FIG. 3, an actual viscosity-versus-time, and temperature versus time plot or profile of a final curing step of a composite, is shown. The graph shows changes in the dynamic viscosity of the composite as a function of time while the composite is cured in an autoclave. The dynamic viscosity of the composite was measured in accordance with the novel method of the present invention, i.e. by substantially continuously measuring the ultrasonic wave attenuation of the composite during the curing cycle. Because, the ambient temperature, as well as the pressure, is not constant in the autoclave during the curing cycle, the ambient temperature in the autoclave was measured and recorded simultaneously with the recording of the viscosity values. Furthermore, a point in the graph indicates the time when substantially larger than atmospheric pressure was applied.

The graph of FIG. 3, grossly shows that the viscosity of the composite, or more strictly speaking of the resin substrate of the composite, substantially continuously decreases during approximately the first half of the curing cycle. This is in response to the substantially continuously increasing temperature of the autoclave. In the approximate second half of the curing cycle, however, the viscosity increases substantially continuously even though the temperature is high, (at least 240° F). This is because of the chemical cross-linking or final polymerization which occurs in the resin substrate of the composite and which drastically changes the viscoelastic properties of the composite.

Figure 4:
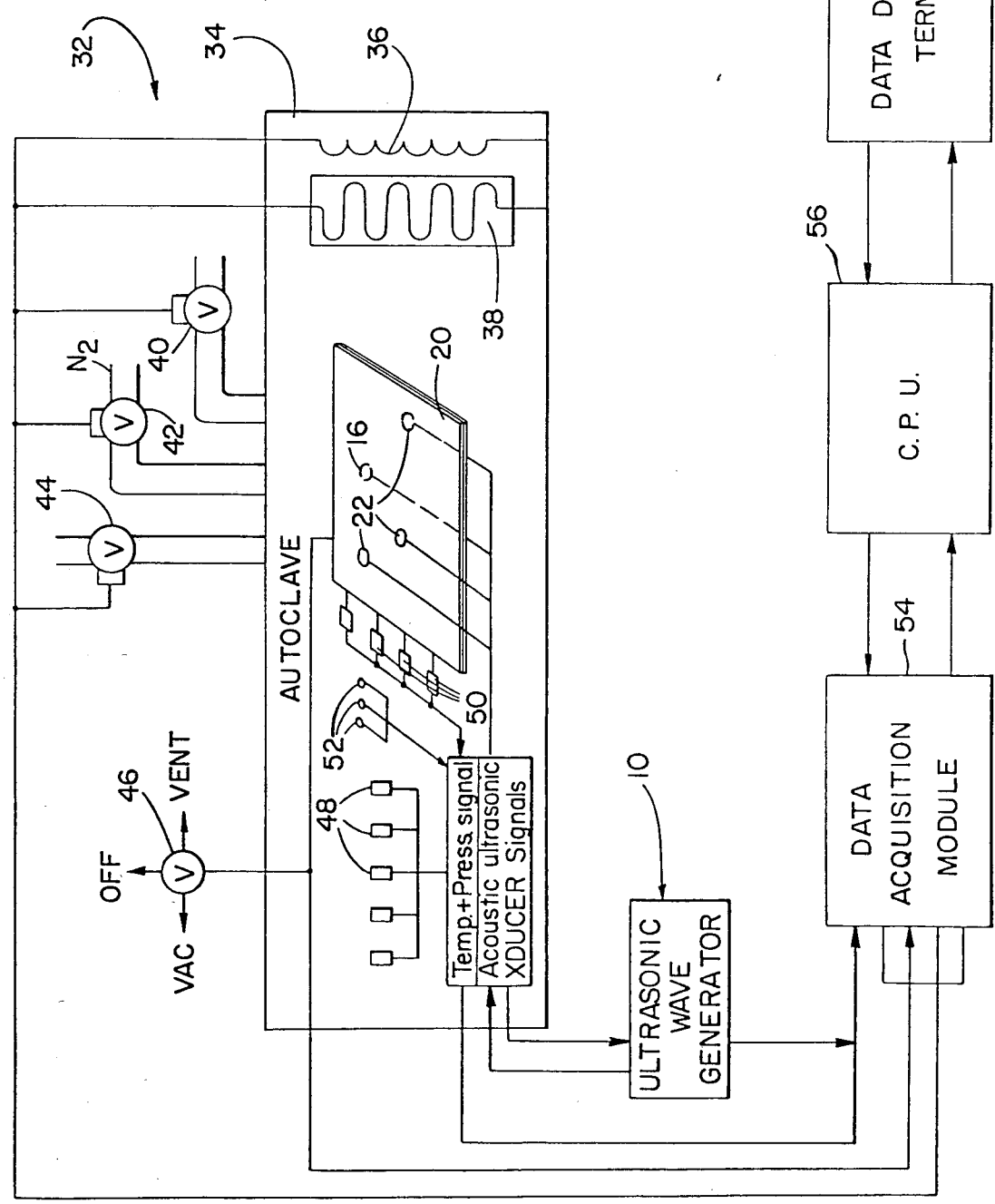
FIG. 4 is a schematic view of a preferred embodiment of the system of the present invention.

As is known in the art, however, the above summarized, gross monitoring of the curing process is insufficient for attaining a fine control of the final properties of the cured composite. The graph of FIG. 3 also shows that relatively small changes in the autoclave temperature result in significant changes in the viscosity of the composite. As it was pointed out above in the introductory section of the present application for patent, finely controlling the relative in the parameters of the curing cycle, and accurately determining the time when pressure should be applied to the autoclave, has been an elusive goal of the prior art. In accordance with the present invention, this is, however, rendered possible by the system 32 schematically shown on FIG. 4.

The system 32 includes an autoclave 34 of the type normally used in the art for the final curing of composites. A specimen 20 of the composite is shown in the autoclave 34. The autoclave 34 includes a suitable heating element 36, cooling coils 38, and valves for introduction of pressurized air, and pressurized nitrogen gas, into the autoclave 34. The valves for air and nitrogen respectively bear the reference numerals 40 and 42, and a valve for venting pressurized gas out of the autoclave 34 bears the reference numeral 44. A fourth valve 46 is provided for connection to a vacuum line (not shown) whereby air or nitrogen gas can be very rapidly removed from a sealing enclosure or "bag" (not shown) which typically encompasses the part being cured.

A plurality of heat sensors or transducers 48 are mounted into the autoclave 34 for sensing the ambient temperature of the autoclave 34. These are hereinafter referred to as ambient temperature sensors 48. In addition, a plurality of heat sensors or transducers 50 are also mounted in contact with the surface of the specimen 20 for sensing the actual temperature of the specimen 20. The heat sensors or transducers 50 are hereinafter referred to as surface or part temperature sensors 50.

A plurality of ambient pressure sensors or transducers 52 are also mounted in the autoclave 34. Finally, an ultrasonic wave generating and attenuation measuring device 10 is included in the system 32, and has an ultrasonic wave sending transducer 16 and at least one receiving transducer 22 mounted to the specimen 20 in the autoclave 34. In the herein described preferred embodiment of the system of the present invention, the ultrasonic shock wave attenuation measuring device 10 is the above noted 206 AU model of the Acoustic Emission Technology Corporation of Sacramento, Calif.

The system 32 further includes a data acquisition and control module 54 wherein analog signals incoming from the respective ambient and surface temperature sensors 48 and 50, pressure sensors 52, and ultrasonic wave attenuation sensors 22 are converted into digital signals. The digital signals of the data acquisition and control module 54 are then fed into a central processing unit or computer 56, wherein the hereinafter described calculations and comparisons are performed in accordance with a process control algorithm. The computer 56 includes a memory, into which the hereinafter specifically described reference data and profiles are fed.

Digital data corresponding to command controls emanating from the computer 56 are converted into analog control signals in the data acquisition and control module 54. The analog control signals are used to create the appropriate responses in the operation of the system 32, such as turning off or decreasing the output of the heating element 36, opening or closing the valves and the like. It should be noted that the individual components of the system are of conventional construction, and, therefore, need not be described here in detail. In the herein described preferred embodiment, the data acquisition and control module 54 is a Hewlett Packard Model No. 3497A, the computer 56 may be any commercially available computer compatible therewith. The system 32 also includes a data display terminal 58 connected to the computer 56, which may include a CRT display (not shown) and a printer or plotter (not shown) for permanent recordation of the measured parameters of the curing process.

Figure 5:
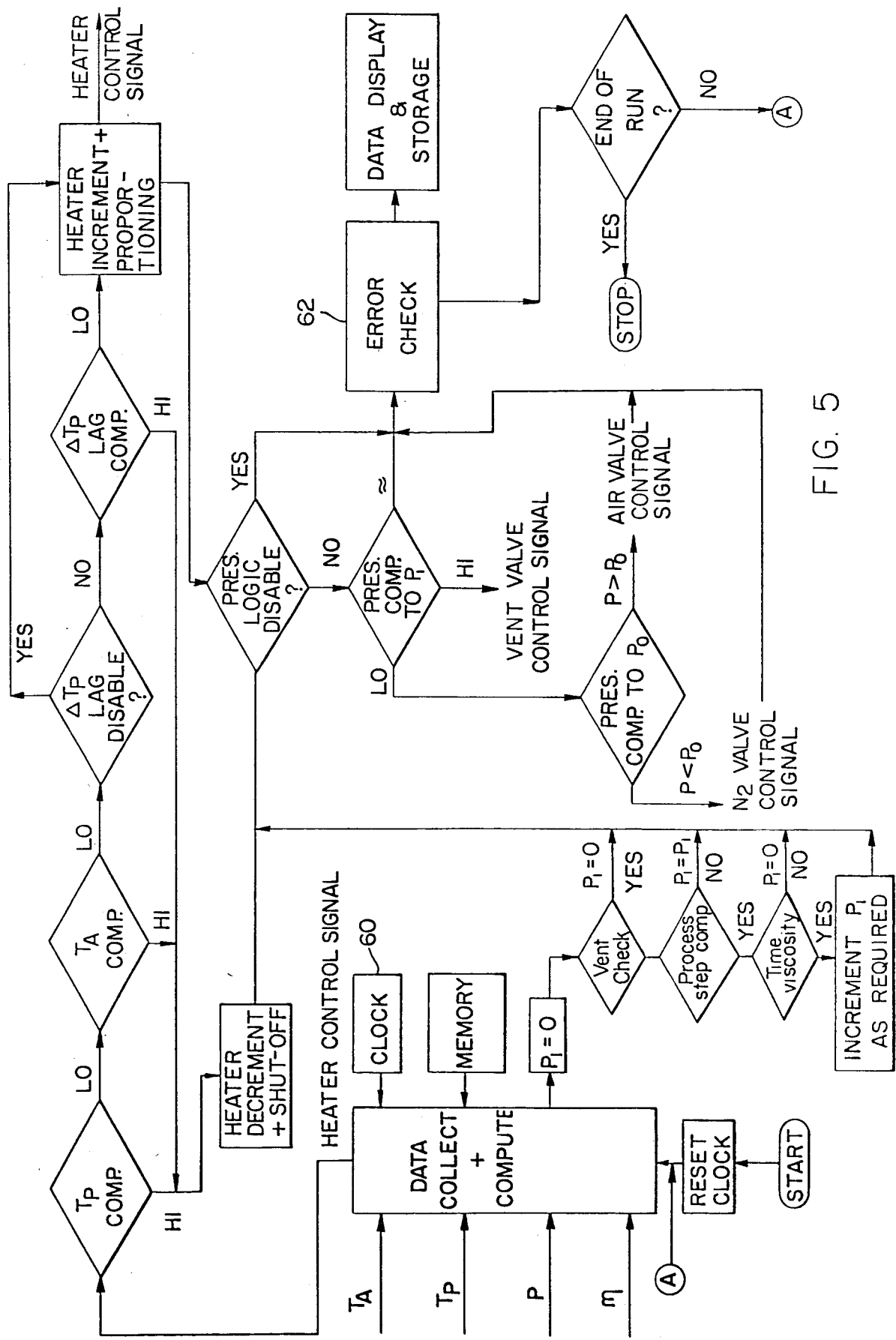
FIG. 5 is a schematic representation of the process control logic of the preferred embodiment of the system of the present invention.

Referring now to the schematic view of FIG. 5, the specific operational logic of the preferred embodiment of the system is disclosed.

The system includes a temperature control logic which is governed by the desired temperature profile of the curing process for the composite 20. This temperature profile is stored in the memory of the computer 56. More particularly, the entire curing process is divided into specific steps which are sequentially numbered. For each step, the desired rate of heating expressed in units of °F./min., the desired constant temperature of the composite (hold temperature) if any, and the desired time at the hold temperature (hold time) is programmed into the computer 56. In addition, the maximum allowable heating rate, and a minimum heating rate, are also programmed into the computer. A specific example of the above data is shown in Table II, under the heading "Heat Logic Parameters."

TABLE II

| | HEAT LOGIC PARAMETERS | | |
|---|---|---|---|
| STEP # | HEAT RATE °F./MIN | Desired Part Temp. at beginning of the step | HOLD TIME (MIN) |
| 1 | 8 | 200 | 0 |
| 2 | 3 | 250 | 0 |
| 3 | 0 | 250 | 60 |
| 4 | 3 | 350 | 0 |
| 5 | 0 | 350 | 120 |
| 6 | −5 | 80 | 0 |

MAXIMUM HEAT RATE °F./MIN: 10
MINIMUM HEAT RATE °F./MIN: 1
NUMBER OF HEAT LOGIC STEPS PROCESS STEPS: 6

The temperature control logic is also governed by data regarding the maximum allowable differential in temperature between any two points measured on the surface of the composite specimen 20. An example of the actual values of the aforesaid maximum allowable temperature differential as a function of the actual average surface or part temperature, is given in Table III under the heading "Temperature Lag Logic Parameters."

The computer 56 is also programmed to observe a maximum tolerable overshoot temperature; i.e. a maximum permissible temperature difference between the required surface or part temperature and the average ambient autoclave temperature. In this regard it is noted, that the term average temperature is used to denote the average of the several simultaneous readings of the several functioning temperature sensors 48 or 50, as applicable, of the system 32.

TABLE III

| | TEMPERATURE LAG LOGIC PARAMETERS | | |
|---|---|---|---|
| STEP # | MAXIMUM PERMISSIBLE PART TEMPERATURE DIFFERENTIAL | FROM TEMP | TO TEMP |
| 1 | 15 | 80 | 200 |
| 2 | 10 | 200 | 230 |
| 3 | 5 | 230 | 250 |
| 4 | 5 | 250 | 350 |

MAXIMUM TEMP OVERSHOOT = 20

Thus, in the example shown in Table III, the ideal parameters of the curing process require, and the computer 56 is accordingly programmed so that during the first step of the process, the maximum temperature differential of the composite specimen 20 should not exceed 15° F., and in the second step the maximum temperature differential should not exceed 10° F. Furthermore, the ambient temperature of the autoclave 34 must never exceed by more than 20° F. the computed required part temperature for this time in the process cycle.

The heat sensors 48 and 50 of the system 32 continuously monitor the ambient autoclave and the composite part temperature. According to the logic programmed into the computer 56 in the form of the process control algorithm, the part temperature ($T_p$) is continuously compared by the logic to the programmed temperature as shown in Table II. If the part temperature is too high, the heating element 36 is shut off or decreased in output. If the part temperature is low or at the programmed temperature, the logic then compares the ambient temperature corresponding to the then required part temperature. In other words, in the example given, if the part temperature does not exceed the desired value in the particular step in progress, the logic checks whether the actual ambient temperature exceeds with more than 20° F. the actual required part temperature. If there is more than the permissible overshoot, the heating elements are shut off or decreased in output.

If on the other hand, no impermissible overshoot exists, the computer checks whether the logic circuit regarding maximum allowable part differential (temperature lag logic) is disabled or not. The circumstances under which the temperature lag logic is disabled are described below. If the temperature lag logic is not disabled, then the maximum temperature differential ($\Delta T_p$) between any two points of the composite specimen 20 is compared to the maximum allowable differential in the given temperature range. In the specific example given, if the curing process is in its second step, and the average surface or part temperature ($T_p$) is 210° F., the computer 56 checks whether $\Delta T_p$ exceeds 10° F. If $\Delta T_p$ does not exceed the maximum permissible value, then the heating is continued or turned on, as applicable. If, on the other hand, $\Delta T_p$ exceeds the maximum permissible value, then the heating is turned off or decreased.

As was noted above, the temperature lag logic may be disabled under certain circumstances. This occurs, when the temperature lag logic and the comparison of the actual part temperature to desired part temperature result in conflicting commands. For example, comparison of actual part temperature with the stored desired value of the part temperature may require continued heating. At the same time, however, the temperature lag logic circuit may require that the heating be discontinued. In such an event, the computer 56 is programmed to disregard the temperature lag logic circuit command and continue heating, albeit only at the minimum permissible rate. In the specific example shown in Table I, this rate is 1° F./minute.

Still referring to FIG. 5, operation of the pressure control logic is explained. The pressure control logic operates independently of the temperature control logic, and determines whether the autoclave 34 should be pressurized or kept at atmospheric pressure. Therefore, the pressure control logic in effect, operates the several vents and valves which introduce pressurized nitrogen or air into the autoclave 34, or vent the pressurized gas from the same. In this regard, it is noted that the pressure in the autoclave 34 may exceed a desired pressure not only because of over pressurization, but also because the pressure of the gas in the autoclave 34 increases as the autoclave 34 is heated.

In accordance with one aspect of the present invention, the actual pressure or ambient pressure (P) inside of the autoclave 34 is continuously measured and compared to a predetermined desired pressure profile which is stored in the computer's 56 memory. Furthermore, the valves and vents are actuated to maintain the actual pressure in the autoclave 34 in close conformity with the predetermined profile. The predetermined pressure profile, however, may be a relatively simple profile. In the specific example given here, the pressure profile requires either atmospheric or a fixed reference pressure, specifically 85 PSI, in the autoclave 34. Thus, in the specific example given, the computer 56 is programmed to maintain atmospheric pressure in the autoclave 34 until 20 minutes have passed in step 3 of the curing process. At that point, 85 PSI should be applied and maintained until 200° F. is reached in step 6, at which time the pressure should be vented. It is readily apparent from the foregoing description, that accurate maintenance of even such a relatively simple pressure profile is not possible without continuous monitoring of the actual pressure in the autoclave 34 and continuous use of the obtained data to govern operation of the pressurization and venting valves.

Still having specific reference to FIG. 5, a first pressure control logic, having the continuous input of the pressure sensors 52 is shown. The pressure control logic first checks if the input of the pressure sensors 52 is manually overridden, i.e. disabled. If the pressured control logic is not manually disabled, the actual pressure (P) is compared to a reference pressure ($P_1$). If P is higher than the reference pressure $P_1$, the venting mechanism is actuated. If P is lower than the reference pressure ($P_1$), the logic gives appropriate control commands to bring the pressure of the autoclave up to the reference pressure ($P_1$). In order to determine whether the pressurization should occur via air or nitrogen, the logic also compares the actual ambient pressure (P) to another programmed reference pressure $P_o$. If P is smaller than $P_o$, the autoclave is pressurized with nitrogen gas, otherwise with air.

A second aspect of the pressure control logic is concerned with the determination of the reference pressure value $P_1$. In the herein described specific embodiment, the pressure control logic first checks whether the particular step in the curing process calls for venting of the autoclave. If the step calls for venting, the reference pressure $P_1$ is considered to be zero (0), i.e. atmospheric pressure. If the particular step of the curing process in progress does not call for venting, the pressure control logic checks whether the momentarily existing reference pressure $P_1$ is in fact the one called for by the step in progress. If this is the case, the instantaneous value of $P_1$ is maintained.

In the next step, however, the logic may depend on a real time input, viscosity input, or both, to determine the proper reference value ($P_1$) of the pressure. In accordance with one embodiment of the present invention, the logic may simply depend on the programmed pressure-versus-time profile to determine the correct reference pressure. For example, in the preferred embodiment specifically described here, the logic, with the assistance of a real time clock 60, may establish that 20 minutes have elapsed in step 3 of the process, and therefore $P_1$ should be adjusted to 85 PSI.

In another embodiment of the present invention, the logic evaluates the input of the ultrasonic wave attenuation sensors 22, computes the corresponding viscosity, and adjusts the pressure in accordance with a programmed pressure-versus-viscosity profile. In this regard, it is noted that the viscosity of the resin substrate 20 is continuously monitored, and preferably permanently recorded during the entire curing process.

In still another embodiment of the present invention, the pressure control logic, will adjust $P_1$ to a predetermined value, such as 85 PSI, provided the measured viscosity reaches a predetermined reference value.

In yet another preferred embodiment of the present invention, such as the one specifically disclosed herein, the pressure control logic will increment the reference pressure ($P_1$) to a predetermined value as soon as the predetermined reference viscosity is reached. If, however, the predetermined reference viscosity is not reached prior to expiration of a programmed time period, the programmed pressure-versus-time profile overrides the programmed pressure-versus-viscosity profile, and the reference pressure is adjusted regardless of the actual viscosity data input.

It is believed that a person having average skill in the art of computer programming is able to prepare an operational process control program on the basis of the above description. Nevertheless, for the sake of full and complete disclosure, a copy of the process control program of the hereinabove given specific example, is submitted simultaneously with the present application for patent. The simultaneously submitted program is hereby expressly incorporated by reference.

In addition to the hitherto enumerated components, the system 32 of the present invention includes an error check logic, and corresponding circuitry 62. The error check logic and circuitry 62 checks, in effect, whether the several elements of the system 32 are functioning properly. For example, the error check logic and circuitry 62 checks if pressurization and heating indeed occur when the appropriate command signals are given.

The several advantages of the above-described system of the present invention have already been described or alluded to in the foregoing. In summary, the present system permits precise in-process control of the final curing step of composite materials based upon in-process measurements of vital physical parameters of the process and upon instantaneous feedback to control said parameters. A process engineer may first empirically determine the optimal parameters of the curing process, and with the assistance of the present system 32 substantially observe such parameters every time the curing process is performed. Several modifications of the present invention may become readily apparent to those skilled in the art in light of the above disclosure. Therefore, the scope of the present invention should be determined solely from the following claims.

What is claimed is:

1. A process for determining the dynamic viscosity of a stationary specimen of a polymeric resin which is subjected to a time-varying temperature, the process comprising the step of determining the amplitude attenuation of an ultrasonic wave in the polymeric resin, to obtain a value which has a linear relationship to the logarithm of the dynamic viscosity.

2. The process of claim 1 wherein the step of determining includes a step of passing an ultrasonic wave of a known amplitude through the resin, and a step of sensing the amplitude of the ultrasonic wave after it has travelled through the resin.

3. The process of claim 2 wherein the frequency of the ultrasonic wave is in the 0.1-2.5 MHz range.

4. The process of claim 3 wherein the amplitude sensed is a root mean square amplitude of the ultrasonic wave.

5. The process of claim 2 wherein the polymeric resin is a binding resin of a fiber-reinforced composite.

6. A process for monitoring the viscosity of a resin substrate of a fiber-reinforced composite material undergoing a final curing step during which the composite material is subjected to a time-varying temperature, the process comprising the steps of:

irradiating the composite material with an ultrasonic wave, at least the root mean square amplitude of which is known; and sensing at least the root mean square amplitude of the ultrasonic wave after it has travelled through at least a portion of the composite material, and thereby obtaining a value which has a linear relationship to the logarithm of the instantaneous viscosity of the resin.

7. The process of claim 6 wherein the ultrasonic wave is in the 0.1-2.5 MHz frequency range.

8. The process of claim 6 wherein the process includes the additional steps of positioning an ultrasonic wave source on a surface of the composite material and positioning an ultrasonic wave amplitude sensor on a surface of the composite material at a location remote from the location of said source.

* * * * *